United States Patent [19]
Cherry

[11] Patent Number: 5,536,037
[45] Date of Patent: Jul. 16, 1996

[54] DEPLOYMENT DOOR FOR USE IN A VEHICLE OCCUPANT RESTRAINT APPARATUS

[75] Inventor: Rodger M. Cherry, Macomb Township, Mich.

[73] Assignee: TRW Vehicle Safety Systems Inc., Lyndhurst, Ohio

[21] Appl. No.: 342,119

[22] Filed: Nov. 18, 1994

[51] Int. Cl.$^6$ ............................................. B60R 21/16
[52] U.S. Cl. ................................. 280/728.3; 280/732
[58] Field of Search ........................... 280/728.3, 731, 280/732

[56] References Cited

U.S. PATENT DOCUMENTS

| | | | |
|---|---|---|---|
| 3,794,349 | 2/1974 | Fuller | 280/732 |
| 5,110,647 | 5/1992 | Sawada et al. | 428/43 |
| 5,280,947 | 1/1994 | Cooper | 280/728.3 |
| 5,335,935 | 8/1994 | Proos et al. | 280/728.3 |

FOREIGN PATENT DOCUMENTS

4300965A1  7/1993  Germany.

*Primary Examiner*—Kenneth R. Rice
*Attorney, Agent, or Firm*—Tarolli, Sungheim, Covell, Tummino & Szabo

[57] ABSTRACT

An apparatus (10) comprises an inflatable occupant restraint (18) which, when inflated, protects an occupant in a vehicle passenger compartment. A deployment door (12) covers an opening (19) through which the occupant restraint (18) is deployed upon inflation of the occupant restraint. The deployment door (12) comprises a relatively soft first material layer (60) and a relatively hard second material layer (70). The relatively hard second material layer (70) includes (i) a first surface (77) which underlies the relatively soft first material layer (60), (ii) an inner surface (74) which is engaged by the occupant restraint (18) when the occupant restraint is inflated and (iii) a projecting portion (76) projecting beyond the first surface (77) and adhered to adjacent relatively soft material (66) of the soft first material layer (60). The projecting portion (76) and the adjacent relatively soft material (66) define a break line (30) such that the projecting portion and the adjacent relatively soft material move away from each other along the break line to uncover the opening (19) when the inflatable occupant restraint (18) is deployed into the passenger compartment.

21 Claims, 2 Drawing Sheets

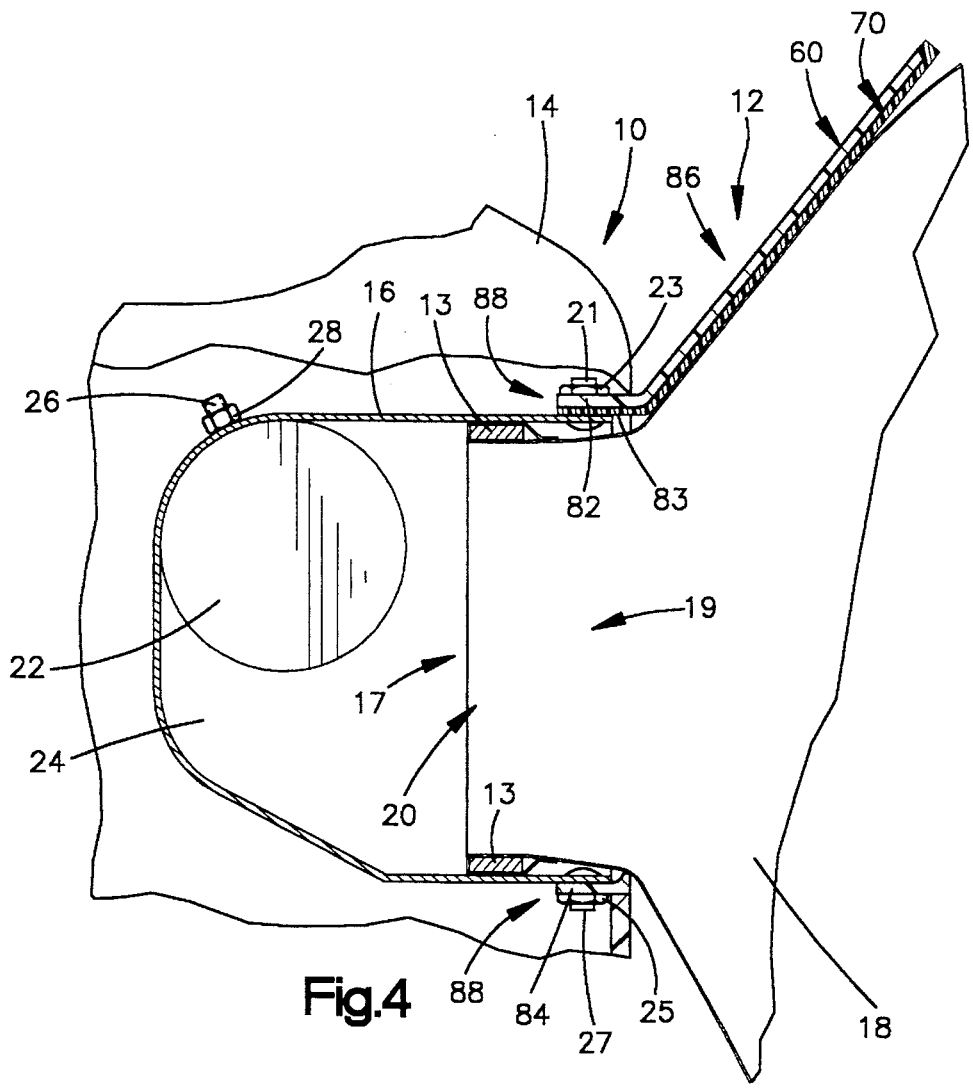
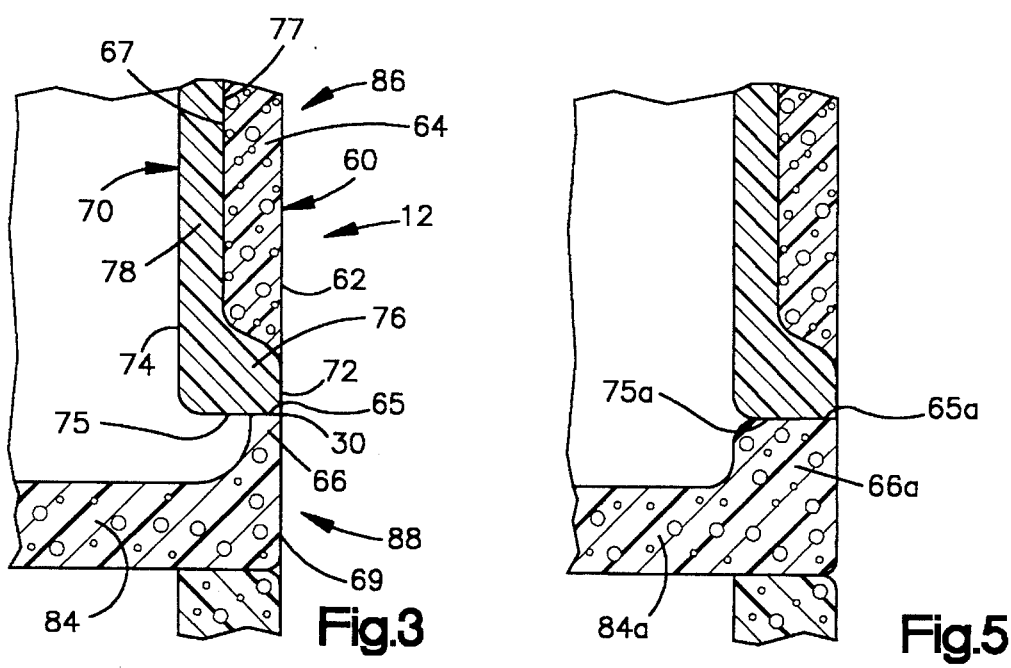
Fig.4
Fig.3
Fig.5

5,536,037

DEPLOYMENT DOOR FOR USE IN A VEHICLE OCCUPANT RESTRAINT APPARATUS

TECHNICAL FIELD

The present invention relates to a vehicle occupant restraint apparatus which includes an inflatable vehicle occupant restraint, such as an air bag, and particularly relates to a deployment door which covers an opening through which the inflatable vehicle occupant restraint is deployed upon inflation of the inflatable vehicle occupant restraint.

BACKGROUND ART

Deployment doors for use in an inflatable vehicle occupant restraint apparatus are known. A deployment door forms an interior portion of the vehicle, such as a portion of the instrument panel or the interior of the vehicle door, depending upon where the inflatable occupant restraint is mounted. A deployment door covers an opening through which an inflatable occupant restraint, such as an air bag, is deployed upon inflation of the air bag. When the air bag inflates, the air bag presses against the deployment door to open the deployment door.

It is desirable to have a deployment door which is relatively soft to the touch, while at the same time rigid enough to provide the door with strength. Typically, tear lines have been molded in the deployment door so that the material of the door tears along the tear lines, and the door pivots open. The molding of tear lines in the deployment door is relatively difficult because such tear lines must be relatively thin. The materials used to make a deployment door generally become more brittle at low temperatures and may thus be more likely than other materials to suffer unintended breakage at the tear lines when cold. Also, since the tear lines are relatively thin, they could break during handling and/or installation of the deployment door.

Further, it is desirable that the deployment door fit properly with the surrounding vehicle structure, such as the vehicle instrument panel, and have a finish which is appropriate for the surrounding vehicle structure. Still further, it is desirable to have a deployment door which can be manufactured reliably and at a reasonable cost.

SUMMARY OF THE INVENTION

In accordance with the present invention, an apparatus comprises an inflatable vehicle occupant restraint, such as an air bag, which when inflated, protects an occupant in a vehicle passenger compartment. A deployment door covers an opening through which the inflatable occupant restraint is deployed upon inflation of the inflatable occupant restraint. The deployment door comprises a relatively soft first material layer and a relatively hard second material layer. The relatively soft first material layer has an outer surface which is exposed to the vehicle passenger compartment. The relatively hard second material layer includes (i) a first surface which underlies the soft first material layer, (ii) an inner surface which is engaged by the inflatable occupant restraint when the inflatable occupant restraint is inflated and (iii) a projecting portion projecting beyond the first surface and adhered to adjacent relatively soft material of the soft first material layer. The projecting portion and the adjacent relatively soft first material define a break line. The projecting portion and the adjacent relatively soft material move away from each other along the break line to uncover the opening when the inflatable occupant restraint is deployed into the vehicle passenger compartment.

Preferably, the relatively hard second material layer comprises a single piece of molded thermoplastic material and the relatively soft first material layer comprises a single piece of thermoplastic material which is molded to the hard second material layer. Also, preferably, the outer surface of the relatively soft first material layer lies flush with a surface of the projecting portion.

BRIEF DESCRIPTION OF THE DRAWINGS

Further features of the present invention will become apparent to those skilled in the art to which the present invention relates from reading the following specification with reference to the accompanying drawings, in which:

FIG. 3 is an enlarged view of a portion of FIG. 2;

FIG. 4 is a view similar to FIG. 2 but showing parts in a different position; and FIG. 5 is a view similar to FIG. 3 and showing another embodiment of the present invention.

DETAILED DESCRIPTION OF PREFERRED EMBODIMENTS

Figure 1:
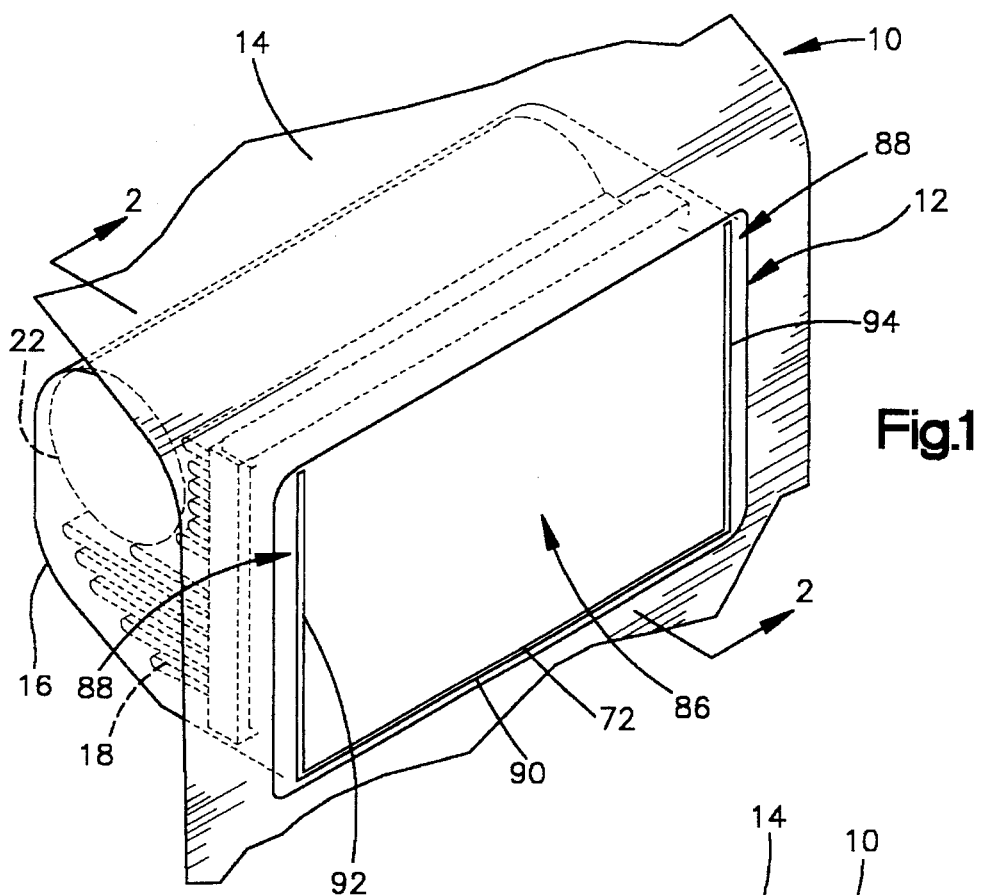
FIG. 1 is a somewhat schematic perspective view of a vehicle occupant restraint apparatus incorporating a deployment door constructed in accordance with the present invention.
Figure 2:
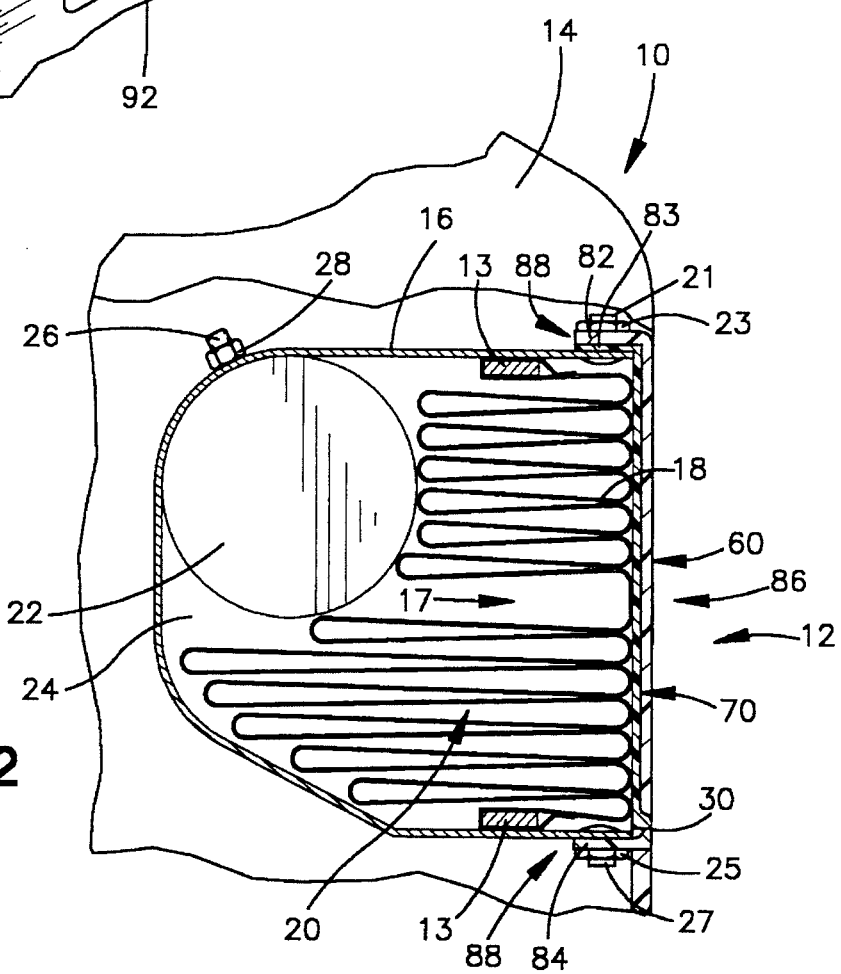
FIG. 2 is a sectional view taken approximately along line 2—2 of FIG. 1.

FIGS. 1 and 2 illustrate a vehicle occupant restraint apparatus 10 that comprises an inflatable air bag 18 and an air bag reaction canister 16. The reaction canister 16 is secured to the vehicle by any suitable means, such as a bracket structure and fasteners (not shown). The air bag 18 is wrapped around and secured to a retaining ring 13 (FIG. 2) in a known manner. The retaining ring 13 is securely attached to the reaction canister 16 by suitable fasteners (not shown). The air bag 18 is, therefore, securely attached to the reaction canister 16.

The air bag 18 has an opening 17 through which inflation fluid can flow into the interior of the air bag to inflate the air bag. An actuatable inflator 22 is secured in a chamber portion 24 of the reaction canister 16. The inflator 22 may be secured in any suitable manner to the reaction canister 16. As illustrated by way of example in the drawings, the inflator 22 has a threaded stud 26 which extends through the reaction canister 16. A nut 28 is screwed onto the stud 26 to attach the inflator 22 securely to the reaction canister 16. The inflator may have a number of studs, like stud 26, onto which nuts, like nut 28, are screwed to attach the inflator 22 to the reaction canister 16.

The air bag 18 is folded and stored in an air bag storage compartment 20 of the reaction canister 16. The folded and stored air bag 18 is deployed into the vehicle passenger compartment upon occurrence of a vehicle collision requiring air bag deployment. The reaction canister 16 has an opening 19 (FIG. 4) through which the air bag 18 is deployed. The reaction canister 16 as schematically illustrated is mounted in the vehicle instrument panel 14.

A deployment door 12 closes the opening 19 through which the air bag 18 is deployed into the vehicle passenger compartment. The deployment door 12 is preferably aligned flush with the vehicle instrument panel 14 when the door 12 is in the closed position.

The deployment door 12 comprises a relatively soft first material layer 60 and a relatively hard second material layer 70. The hard second material layer 70 includes a body portion 78 (FIG. 3) which lies between the air bag 18 and the soft first material layer 60. The hard second material layer 70 includes an inner surface 74 which is presented toward and engaged by the air bag 18 when the air bag 18 is inflated. The hard second material layer 70 further includes a major side surface 77 which lies opposite the inner surface 74. The major side surface 77 is adhered to a major side surface 67 of the soft first material layer 60. The soft first material layer 60 includes (i) a first outer surface portion 62 which lies opposite the major side surface 67 and is exposed to the vehicle passenger compartment and (ii) a second outer surface portion 69 which is also exposed to the vehicle passenger compartment.

The hard second material layer 70 has a projecting portion 76 which extends away from the body portion 78 toward the vehicle passenger compartment. The projecting portion 76 has an outer surface 72 which is shown in the drawings as exposed to the vehicle passenger compartment. The outer surface 72 of the projecting portion 76 lies flush with the first and second outer surface portions 62, 69 of the soft first material layer 60, as shown in FIG. 3. The outer surface 72 could, if desired, be painted or coated or otherwise decorated, as desired, to be compatible with the vehicle interior. An interconnecting surface 75 of the hard second material layer 70 extends between the outer surface 72 and the inner surface 74.

The projecting portion 76 of the hard second material layer 70 has a U-shape, when viewed from the vehicle passenger compartment. Thus, the outer surface 72 (as shown in FIG. 1) is exposed as a U-shaped surface on the vehicle instrument panel 14. The outer surface 72 includes a horizontally extending portion 90 extending across the deployment door 12 near the bottom of the deployment door. The outer surface 72 also includes vertically extending portions 92, 94. The portions 92, 94 extend parallel to each other vertically from the opposite ends of the horizontally extending portion 90 and terminate near the top of the deployment door 12.

The deployment door 12 has a generally rectangular flap portion 86 and a generally U-shaped frame portion 88 surrounding in part the flap portion 86. The flap portion 86 comprises a portion of the soft first material layer 60 having the surface portion 62 and a portion of the hard second material layer 70. The frame portion 88 comprises another portion of the soft first material layer 60 which lies adjacent the U-shaped projecting portion 76 of the hard second material layer 70 and has the surface portion 69.

The top end of the flap portion 86 includes a flange 82 (FIG. 2) of the soft first material layer 60 and a flange 83 of the hard second material layer 70. The flanges 82, 83 are attached to the reaction canister 16 using suitable fasteners, such as bolts 21 and nuts 23. The flap portion 86 includes a relatively flat plate portion 64 (FIG. 3) of the soft first material layer 60 that extends between the flange 82 of the soft first material layer 60 and the projecting portion 76 of the hard second material layer 70. The flat plate portion 64 of the soft first material layer 60 lies adjacent the body portion 78 of the hard second material layer 70. The flap portion 86 has an outer surface which comprises the first outer surface portion 62 of the soft first material layer 60 and the outer surface 72 of the projecting portion 76 of the hard second material layer 70.

The frame portion 88 includes, at the bottom of the deployment door 12, a relatively thick flange portion 84 of the soft first material layer 60 that extends parallel to the flange 82. The frame portion 88 also includes a relatively thin interconnecting portion 66 of the soft first material layer 60 that extends between the flange 84 and the projecting portion 76 of the hard second material layer 70, as best shown in FIG. 3. As shown in FIG. 2, the flange portion 84 is attached to the reaction canister 16 using suitable fasteners, such as bolts 27 and nuts 25. The frame portion 88 has an outer surface which comprises the second outer surface portion 69 of the soft first material layer 60.

The thin interconnecting portion 66 has an interconnecting surface 65 which is adhered to part of the interconnecting surface 75 of the hard second material layer 70, as shown in FIG. 3. The interconnecting surfaces 65, 75 are adhered to each other such that an area contact is formed between the interconnecting surfaces 65, 75. The area contact is continuous throughout the U-shape of the projecting portion 76. Accordingly, the area contact between the interconnecting surfaces 65, 75 is U-shaped.

Each of the first and second material layers 60, 70 comprises thermoplastic material. The composition of each of the first and second material layers 60, 70 can be of various filled, unfilled, alloyed, or composite thermoplastic materials. These thermoplastic materials can be injection molded, compression molded, or blow molded.

Preferably, the hard second material layer 70 comprises a single piece of molded thermoplastic substrate material such as a thermoplastic polyester having a flexural modulus in the range of 40,000 to 120,000 psi in accordance with ASTM standard test No. ASTM-D790. The soft first material layer 60 preferably comprises a single piece of thermoplastic material known as DYM 100, supplied by E. I. DuPont de Nemours, Co., and having a flexural modulus in the range of 12,000 to 16,000 psi in accordance with ASTM standard test No. ASTM-D790. Thus, the hard second material layer 70 has about two and one half (2 ½) to ten (10) times the stiffness of the soft first material layer 60.

To manufacture the deployment door 12, the hard second material layer 70 is molded first. The layer 70 is molded by directing thermoplastic material which is used to make the hard second material layer 70 into a first injection mold. The resulting single piece of molded thermoplastic material forms the hard second material layer 70. The hard second material layer 70 is then placed into a second injection mold with the inner surface 74 engaging one surface portion of the second injection mold and the outer surface 72 engaging another surface portion of the second injection mold. The thermoplastic material which is used to make the soft first material layer 60 is then directed at a relatively high temperature into the second injection mold. This thermoplastic material flows around the single piece of molded thermoplastic material which forms the hard second material layer 70.

As the thermoplastic material which is used to make the soft first material layer 60 flows around the hard second material layer 70, some of the thermoplastic material at the projecting portion 76 of the hard second material layer 70 melts and chemically bonds with the thermoplastic material used to make the soft first material layer 60. As the materials cool, a physical bond is formed between the interconnecting portion 66 and the projecting portion 76 to hold the hard second material layer 70 and the soft first material layer 60 together. The area contact between the interconnecting surfaces 65, 75 defines a break line 30 that extends in a U-shape horizontally across the deployment door 12 and vertically along opposite sides of the deployment door adjacent the outer surface 72 of the hard second material layer 70. The break line 30 extends in a U-shape along the juncture of the interconnecting surface 65 of the soft first material layer 60 and the interconnecting surface 75 of the hard second material layer 70.

When a vehicle collision requiring air bag deployment occurs, inflation fluid is directed through the opening 17 into the interior of the air bag 18 to inflate the air bag. As it inflates, the air bag 18 presses against the inner surface 74 of the hard second material layer 70. The pressure of the air bag 18 against the inner surface 74 continues to increase until the pressure is sufficient to cause the interconnecting surfaces 65, 75 to separate from each other along the U-shaped break line 30.

As the interconnecting surfaces 65, 75 separate along the break line 30, the air bag 18 continues to press against the inner surface 74 of the hard second material layer 70 of the deployment door 12. The pressure of the air bag 18 pivots the flap portion 86 to an open position such as shown in FIG. 4, thereby creating the opening 19 through which the air bag 18 is deployed into the vehicle passenger compartment. Thus, the deployment door 12 separates into the frame portion 88, which remains attached to the reaction canister 16, and the flap portion 86, which pivots from the closed position shown in FIG. 2 to an open position such as shown in FIG. 4.

The relatively hard second material layer 70 provides rigidity to the deployment door 12, while the relatively soft first material layer 60 provides the deployment door 12 with the characteristic of being relatively soft to the touch. The deployment door 12 also does not have slits or thin portions which form a tear line. Further, the deployment door 12 can be manufactured easily.

Another embodiment of the present invention is illustrated in FIG. 5. Since the embodiment of the invention illustrated in FIG. 5 is generally similar to the embodiment illustrated in FIGS. 1–4, similar numerals are utilized to designate similar components, the suffix letter "a" being associated with the numerals of the embodiment of FIG. 5 to avoid confusion.

In the embodiment of FIG. 5, the thickness of the interconnecting portion 66a is the same as the thickness of the flange portion 84a. Accordingly, the interconnecting surface 65a is adhered to a larger area of the interconnecting surface 75a, as compared to the interconnecting surfaces 65, 75 in the embodiment of FIGS. 1–4.

From the above description of the invention, those skilled in the art to which the present invention relates will perceive improvements, changes and modifications. Such improvements, changes and modifications within the skill of the art to which the present invention relates are intended to be covered by the appended claims. Also, although the deployment door 12 illustrated in FIG. 1 forms a portion of the vehicle instrument panel 14, it is contemplated that a deployment door constructed in accordance with the present invention may form a portion of the interior of a vehicle door for covering an air bag located in the vehicle door. Further, it is contemplated that features of the present invention may be used in a cover on a vehicle steering wheel for covering an air bag located on the steering wheel. Thus, the term "deployment door" as used in this application is also intended to mean the cover for an air bag mounted on a steering wheel.

Having described the invention, the following is claimed:

1. An apparatus for use in a vehicle having a passenger compartment, said apparatus comprising:

an inflatable vehicle occupant restraint for, when inflated, protecting an occupant in the passenger compartment; and a deployment door which covers an opening through which said inflatable occupant restraint is deployed upon inflation of said inflatable occupant restraint, said deployment door comprising a relatively soft first material layer and a relatively hard second material layer;

said relatively soft first material layer including an outer surface which is exposed to the passenger compartment;

said relatively hard second material layer including (i) a first surface which underlies said relatively soft first material layer, (ii) an inner surface which is engaged by said inflatable occupant restraint when said inflatable occupant restraint is inflated and (iii) a projecting portion projecting beyond said first surface and adhered to adjacent relatively soft material of said soft first material layer, said projecting portion and said adjacent relatively soft material defining a break line such that said projecting portion and said adjacent relatively soft material move away from each other along said break line to uncover said opening when said inflatable occupant restraint is deployed into the passenger compartment;

said projecting portion having a portion exposed to the passenger compartment.

2. An apparatus according to claim 1 wherein each of said first and second material layers comprises thermoplastic material.

3. An apparatus according to claim 1 wherein said relatively hard second material layer comprises a single piece of molded thermoplastic material and said relatively soft first material layer comprises a single piece of thermoplastic material which is molded to said relatively hard second material layer.

4. An apparatus according to claim 1 wherein said break line is located between said projecting portion and said adjacent relatively soft material.

5. An apparatus according to claim 1 wherein said outer surface of said soft first material layer lies flush with a surface of said projecting portion.

6. An apparatus according to claim 5 wherein said break line extends along a juncture between said outer surface of said soft first material layer and said surface of said projecting portion.

7. An apparatus for use in a vehicle having a passenger compartment, said apparatus comprising:

a deployment door for covering an opening through which an inflatable occupant restraint is deployed upon inflation of the inflatable occupant restraint to protect an occupant in the passenger compartment, said deployment door comprising:

a relatively soft first material layer and a relatively hard second material layer;

said relatively soft first material layer including an outer surface which is exposed to the passenger compartment;

said relatively hard second material layer including (i) a first surface which underlies said relatively soft first material layer, (ii) an inner surface which is engaged by the inflatable occupant restraint when the inflatable occupant restraint is inflated and (iii) a projecting portion projecting beyond said first surface and adhered to adjacent relatively soft material of said soft first material layer, said projecting portion and said adjacent relatively soft material defining a break line such that said projecting portion and said adjacent relatively soft material move away from each other along said break line to uncover said opening when the inflatable occupant restraint is deployed into the passenger compartment;

said projecting portion having a portion exposed to the passenger compartment.

8. An apparatus according to claim 7 wherein each of said first and second material layers comprises thermoplastic material.

9. An apparatus according to claim 7 wherein said relatively hard second material layer comprises a single piece of molded thermoplastic material and said relatively soft first material layer comprises a single piece of thermoplastic material which is molded to said relatively hard second material layer.

10. An apparatus according to claim 7 wherein said break line is located between said projecting portion and said adjacent relatively soft material.

11. An apparatus according to claim 7 wherein said outer surface of said soft first material layer lies flush with a surface of said projecting portion.

12. An apparatus according to claim 11 wherein said break line extends along a juncture between said outer surface of said soft first material layer and said surface of said projecting portion.

13. An apparatus for use in a vehicle having a passenger compartment, said apparatus comprising:

an inflatable vehicle occupant restraint for, when inflated, protecting an occupant in the passenger compartment; and a deployment door which covers an opening through which said inflatable occupant restraint is deployed upon inflation of said inflatable occupant restraint, said deployment door comprising a relatively soft first material layer and a relatively hard second material layer;

said relatively soft first material layer including an outer surface which is exposed to the passenger compartment;

said relatively hard second material layer including (i) a first surface which underlies said relatively soft first material layer, (ii) an inner surface which is engaged by said inflatable occupant restraint when said inflatable occupant restraint is inflated and (iii) a projecting portion projecting beyond said first surface and adhered to adjacent relatively soft material of said soft first material layer, said projecting portion and said adjacent relatively soft material defining a continuous U-shaped break line such that said projecting portion and said adjacent relatively soft material move away from each other along said break line to uncover said opening when said inflatable occupant restraint is deployed into the passenger compartment.

14. An apparatus according to claim 13 wherein each of said first and second material layers comprises thermoplastic material.

15. An apparatus according to claim 13 wherein said relatively hard second material layer comprises a single piece of molded thermoplastic material and said relatively soft first material layer comprises a single piece of thermoplastic material which is molded to said relatively hard second material layer.

16. An apparatus according to claim 13 wherein said break line is located between said projecting portion and said adjacent relatively soft material.

17. An apparatus for use in a vehicle having a passenger compartment, said apparatus comprising:

an inflatable vehicle occupant restraint for, when inflated, protecting an occupant in the passenger compartment; and a deployment door which covers an opening through which said inflatable occupant restraint is deployed upon inflation of said inflatable occupant restraint, said deployment door comprising a relatively soft first material layer and a relatively hard second material layer;

said relatively soft first material layer including an outer surface which is exposed to the passenger compartment;

said relatively hard second material layer including (i) a first surface which underlies said relatively soft first material layer, (ii) an inner surface which is engaged by said inflatable occupant restraint when said inflatable occupant restraint is inflated and (iii) a projecting portion projecting beyond said first surface and adhered to adjacent relatively soft material of said soft first material layer, said deployment door having a bond of said projecting portion and said adjacent relatively soft material, said bond defining a break line where said projecting portion and said adjacent relatively soft material break away from each other to uncover said opening when said inflatable occupant restraint is deployed into the passenger compartment.

18. An apparatus for use in a vehicle having a passenger compartment, said apparatus comprising:

an inflatable vehicle occupant restraint for, when inflated, protecting an occupant in the passenger compartment; and a deployment door which covers an opening through which said inflatable occupant restraint is deployed upon inflation of said inflatable occupant restraint, said deployment door comprising a relatively soft first material layer and a relatively hard second material layer;

said relatively soft first material layer including an outer surface which is exposed to the passenger compartment;

said relatively hard second material layer including (i) a first surface which underlies said relatively soft first material layer, (ii) an inner surface which is engaged by said inflatable occupant restraint when said inflatable occupant restraint is inflated and (iii) a projecting portion projecting beyond said first surface and adhered to adjacent relatively soft material of said soft first material layer, said projecting portion and said adjacent relatively soft material defining a break line such that said projecting portion and said adjacent relatively soft material move away from each other along said break line to uncover said opening when said inflatable occupant restraint is deployed into the passenger compartment; said outer surface of said soft first material layer lying flush with a surface of said projecting portion.

19. An apparatus according to claim 18 wherein said break line extends along a juncture between said outer surface of said soft first material layer and said surface of said projecting portion.

20. An apparatus for use in a vehicle having a passenger compartment, said apparatus comprising:

a deployment door for covering an opening through which an inflatable occupant restraint is deployed upon inflation of the inflatable occupant restraint to protect an occupant in the passenger compartment, said deployment door comprising:

a relatively soft first material layer and a relatively hard second material layer;

said relatively soft first material layer including an outer surface which is exposed to the passenger compartment;

said relatively hard second material layer including (i) a first surface which underlies said relatively soft first material layer, (ii) an inner surface which is engaged by the inflatable occupant restraint when the inflatable occupant restraint is inflated and (iii) a projecting portion projecting beyond said first surface and adhered to adjacent relatively soft material of said soft first material layer, said projecting portion and said adjacent relatively soft material defining a break line such that said projecting portion and said adjacent relatively soft material move away from each other along said break line to uncover said opening when the inflatable occupant restraint is deployed into the passenger compartment; said outer surface of said soft first material layer lying flush with a surface of said projecting portion.

21. An apparatus according to claim 20 wherein said break line extends along a juncture between said outer surface of said soft first material layer and said surface of said projecting portion.

* * * * *